Dec. 27, 1938.  C. DE L. RICE  2,141,450
BRAKING MECHANISM FOR RAILWAY CARS
Filed July 24, 1935   2 Sheets-Sheet 2
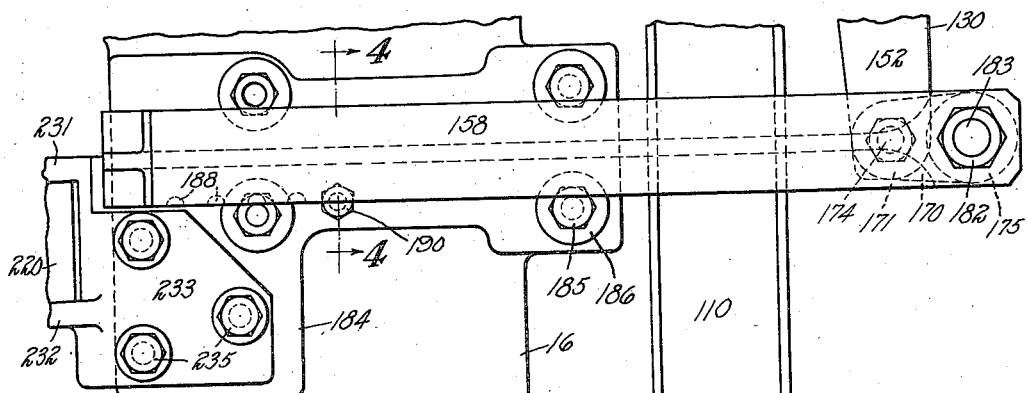
Fig. 3
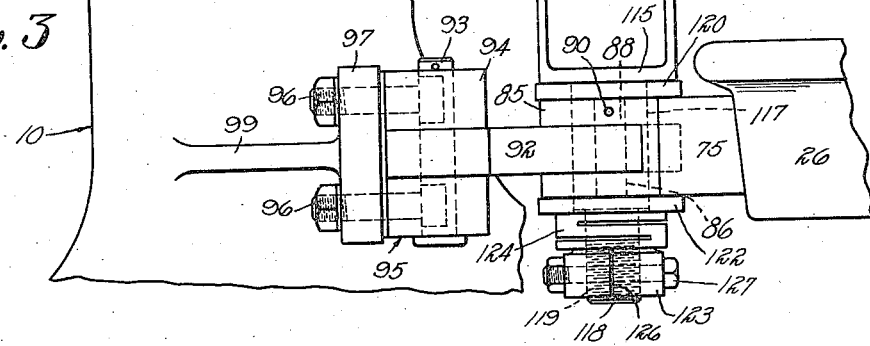
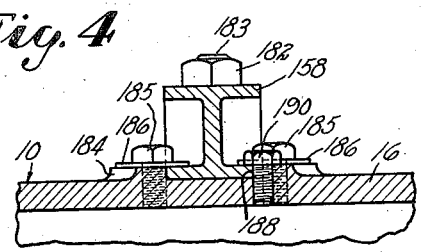
Fig. 4
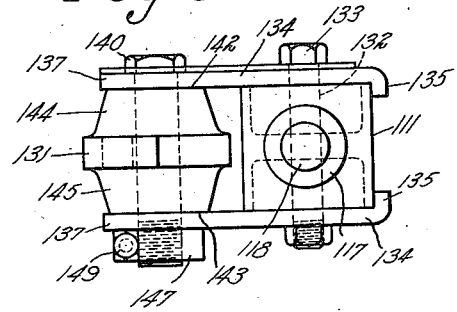
Fig. 5
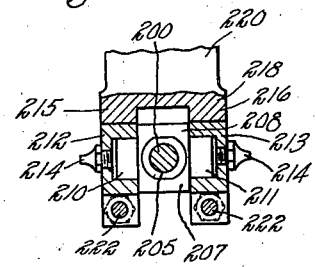
Fig. 6
Inventor
Charles DeLos Rice
By K. Clay Lindsey
Attorney Patented Dec. 27, 1938

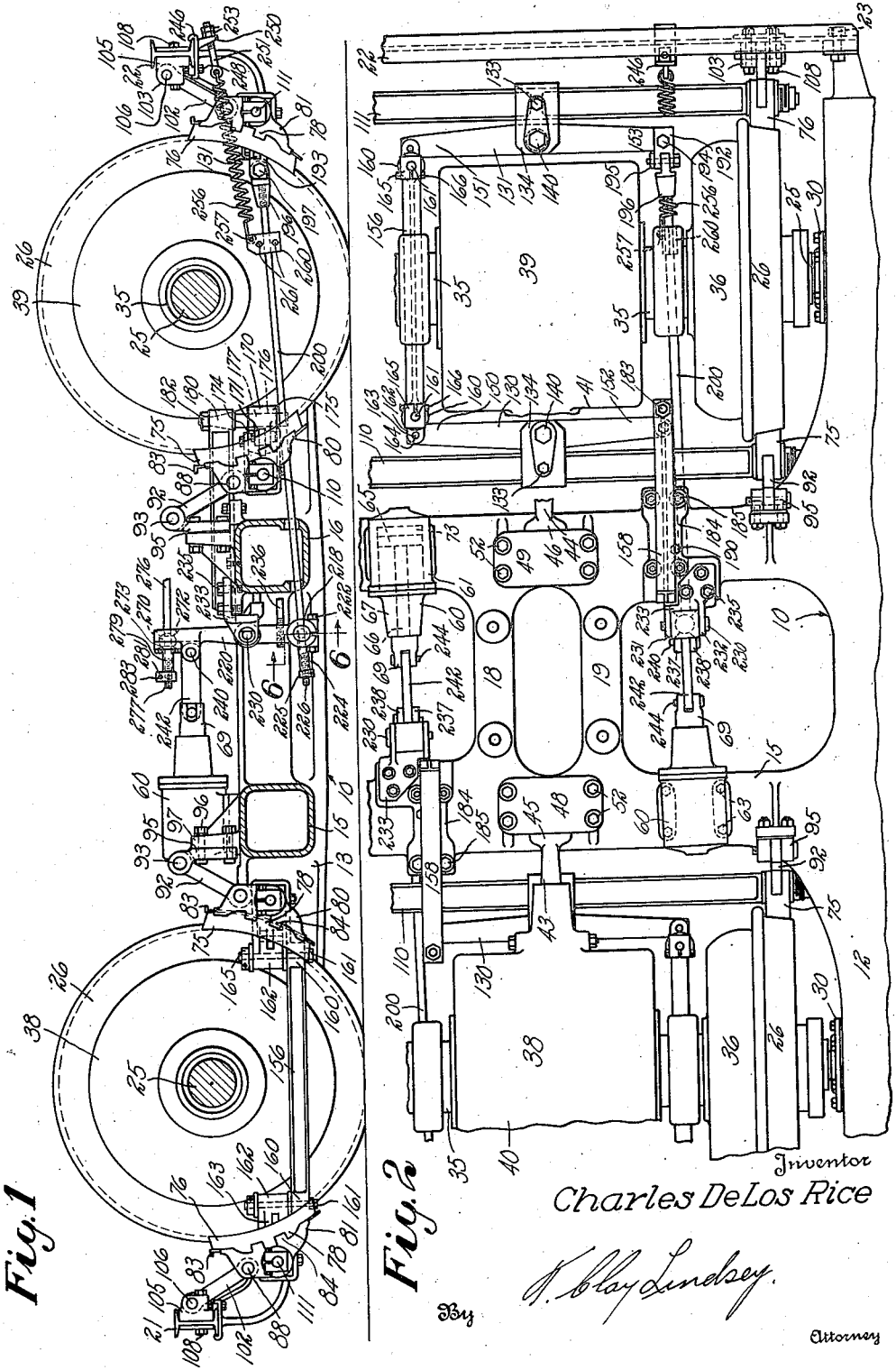

2,141,450

UNITED STATES PATENT OFFICE 2,141,450

BRAKING MECHANISM FOR RAILWAY CARS

Charles De Los Rice, West Hartford, Conn.

Application July 24, 1935, Serial No. 32,851

5 Claims. (Cl. 188—56)

This invention relates to braking devices for retarding and preventing wheel rotation and, more particularly, to improvements in braking mechanisms as applied to railway cars.

The primary object of my invention is to provide a brake mechanism which may be secured to a car truck as a unit therewith and will simultaneously apply an equalized braking pressure to each of a plurality of car wheels to smoothly retard and stop the movement of a car.

It is a further object of my invention to provide a power actuated braking mechanism arranged to evenly and simultaneously apply a plurality of braking members to the same car wheel with a uniformly distributed pressure.

A still further object in this invention resides in the provision of a brake mechanism of the character described which is compactly and simply constructed in such a manner that the various parts of the mechanism are easily accessible and will not fail in use.

Other objects and advantages will be apparent in the following description of the preferred form of my invention.

In the drawings, wherein like numerals indicate like parts:

Figure 1 is a side elevation of my invention which is partly broken away to better illustrate various parts of the brake mechanisms;

Fig. 2 is a fragmentary plan view of the invention;

Fig. 3 is an enlarged fragmentary plan view showing a brake shoe in operative wheel engagement and the parts associated therewith;

Fig. 4 is a sectional view taken along line 4—4 of Fig. 3;

Fig. 5 is an end elevation of a brake shoe beam and equalizer arm assembly; and

Fig. 6 is an enlarged sectional view taken along line 6—6 of Fig. 1.

In accordance with the present invention, I have provided a remotely controlled air pressure actuated brake mechanism particularly adapted for railway cars which is so constructed that each car wheel may be evenly engaged by a plurality of brake shoes under an equalized pressure whereby all of the car wheels may be simultaneously and evenly retarded at a uniform and desired rate to cause the car carried thereby to smoothly slow down and stop without the abrupt jerks and shocks usually attendant with prior well known types of brake mechanisms.

Referring to the drawings, in the form of my invention as illustrated, I have provided a car truck having an integral frame member 10 of the type disclosed in my copending application Serial No. 29,607 filed July 3, 1935, and which preferably is composed of cast steel having two side I-beams or longitudinal bolsters 12 and 13 interconnected by tubular intermediate cross frame members 15 and 16 joined by reinforcing angle irons 18 and 19. The ends of bolsters 12 and 13 are interconnected by suitable rigid cross members, such as I-beams 21 and 22, secured thereto in any convenient manner as by bolts 23. Each of a pair of axles 25 upon which rail wheels 26 are mounted projects outwardly beyond said wheels and is mounted for free rotation within suitable bearings or journal boxes generally indicated at 30. The truck frame 10 may be supported by the journal boxes 30 in any convenient manner such, for example, as my spring truck suspension disclosed in my copending application Serial No. 725,434 filed May 14, 1934. However, it is not deemed necessary to illustrate my method of truck support since it does not constitute part of the present invention.

Each of the driving axles 25 is provided with a tube or quill 35 surrounding the portion of the axle between the wheels thereon, and the ends of each quill are rotatably and resiliently fastened to the wheels by means of cushioned connections generally indicated at 36 and specifically illustrated in Fig. 7 of my copending application Serial No. 593,441 filed February 17, 1934. As shown in Fig. 2 of the accompanying drawings, I have provided a pair of driving motors 38 and 39 mounted upon and surrounding the intermediate portions of each of the quills 35. These motors may be so constructed as to be operated by any type of power from a suitable source, and, in the construction illustrated, they are shown as electrically actuated motors each of which is provided with a rotatable armature arranged to transmit rotation to one of the quills 35.

As shown in my copending application Serial No. 29,607 filed July 3, 1935, the respective outer motor casings 40 and 41, which are rotatably and axially supported upon the quills 35 by means of suitable antifriction bearings, are further provided with the respective laterally protruding torque arms 43 and 44 having flattened end portions 45 and 46 respectively cushioned within the boxes 48 and 49 fastened to the frame cross members 15 and 16 by cap screws 52. These cushioned connections between the torque arms and the boxes serve to absorb shocks and jars attendant with sudden changes of power as well as to provide a slight flexibility between the motor casings and car frame and also prevent rotation of the motor casings.

My brake mechanism preferably comprises a pneumatically operated cylinder and piston which serves, through a cooperating linkage including equalizer arms and brake shoe beams, to simultaneously apply the same braking pressure to each of a plurality of brake shoes engageable with the treads of rail wheels mounted upon the same axle, thereby providing a uniform braking action which not only serves to bring a car to a smooth, even, jerkless stop, but also aids in preventing uneven wheel wear and flat spots on the wheel treads. To accomplish this, I preferably provide a separate air pressure actuated braking mechanism for each pair of coaxially mounted wheels so arranged that each wheel tread is simultaneously engaged by two braking shoes under the same braking pressure. In view of the fact that each car truck is provided with two separate brake mechanisms which are of identical construction, only one of said mechanisms will be described, and like parts will be similarly identified.

My brake mechanism is operated by an air pressure actuated motor 60 which, in the present instance, comprises a cylinder 61 secured to one of the intermediate cross frame members by cap screws 63 and having a bore therein which is adapted to slidably receive a piston 65. A piston rod 66 mounted for axially slidable movement through a cylinder head 67 is secured at one end to the piston 65 and is provided with a slotted portion 69 at its other end which is pivotally connected to suitable linkage to operate the braking mechanism. Each piston 65 serves to divide cylinder 61 and provide a chamber 73 at the end thereof which is connected to a suitable air pressure system by means of piping and valves (not shown) of any well-known construction, whereby compressed air may be directed into said chamber to move piston 65 and rod 66 and operate the brake mechanism connected thereto.

As illustrated in my preferred construction, each of the car wheels may have its tread frictionally engaged by a pair of opposed brake shoes 75 and 76 supported for pivotal swinging movement towards and from the wheel to provide the desired braking action, and each pair of coaxially mounted car wheels 26 may be simultaneously engaged by a pair of cooperating brake shoes 75 on one side of the wheels and a pair of shoes 76 on the other side of the wheels, thereby providing four brakes for each pair of wheels. The brake shoes 75 and 76 are preferably composed of a suitable wear resistant material such as a chilled iron and are substantially arcuate in shape to suitably conform with the curvature of a wheel tread. Each brake shoe is further provided with a plurality of radially protruding tongues 78 arranged to mate with and fit within correspondingly located depressions in the respective brake shoe holders 80 and 81. A curved key 83 passing through the tongues 78 of the brake shoes and similar protruding tongues 84 on the respective brake shoe holders which mate within depressions in the shoes serve to integrally but removably secure the shoes to their holders in such manner that they may be easily disengaged therefrom and replaced when they become worn out.

The brake shoe holder 80 is substantially arcuate in form to conform with the general shape of the brake shoe, and it is provided with a slotted portion 85 having a hole 86 laterally extending therethrough which is adapted to receive a link pin 88 therein. Link pin 88 is firmly secured in position by means of a cotter pin 90 passing diametrically therethrough and received within a hole passing through the brake shoe holder 80. The portion of pin 88 extending between the arms of slotted portion 85 is pivotally engaged by the lower end of a depending link 92 which is pivotally supported at its upper end upon a pin 93 mounted within a slotted portion 94 of a bracket 95. The pin 93 is axially secured within the slotted portion 94 by means of a head at one end and a suitable locking device such as a cotter pin at the other end, and said pin preferably slidably fits within portion 94 and link 92 sufficiently loosely so that it may be easily removed to facilitate brake shoe replacement or repair of the brake mechanism. The link 92 is preferably of such widths at each of its ends that it will closely fit between the respective arms of the slotted portions 85 and 94, thereby preventing any appreciable side sway of the brake shoes 75 relative to the truck frame. Each bracket 95 is rigidly secured by bolts 96 to an upwardly projecting support 97 integral with one of the intermediate cross frame members, and the supports 97 are further strengthened by reinforcing webs 99 integrally cast with the truck frame.

Each brake shoe holder 81 to which a brake shoe 76 is fastened is of duplicate construction to the brake shoe holders 80 and pivotally mounted upon a depending link 102 similar to link 92. The upper end of each link 102 is received between the arms of a slotted portion 103 of a bracket 105 and pivotally supported upon a pin 106 removably secured within the slotted portion 103 in the same manner as pin 93 is secured within bracket 95. The brackets 105 are each rigidly secured to one of the I-beams 21 or 22 in any suitable manner such as by the clamping bolts 108. It will thus be appreciated that each of the brake shoes is pivotally supported relative to the car truck frame and arranged to swing towards and from its respective wheel tread as well as remain in alignment therewith.

Each pair of brake shoes 75 and each pair of shoes 76 is further arranged to move simultaneously towards or from their respective wheel treads as desired. To accomplish this, each pair of shoes 75 is interconnected by a brake shoe beam 110 and each pair of shoes 76 is also connected by a similar beam 111. In view of the fact that these beams 110 and 111 are of the same construction and are connected to their respective brake shoes in the same manner, only one of them will be described in detail. As illustrated in Fig. 3, the brake shoe beam 110 may comprise a rigid steel bar which is shaped as an I-beam throughout the greater portion of its length and is provided with a shoulder 115 adjacent to each end beyond which protrude shaft portions 117 integral therewith and terminating in reduced portions 118 having screw threads 119 thereon. A hardened steel washer 120 slidably engages shaft 117 and abuts shoulder 115. Each brake shoe holder 80 is further provided with a laterally extending hole therethrough adapted to rotatably receive one of the shafts 117 so that the holder may be free to pivotally rock relative to the axis of shaft 117 and permit the brake shoe to conform with the wheel tread contour. Each holder 80 is frictionally and resiliently clamped for rotatable movement upon shaft 117 between the washer 120 and a washer 122 by means of a nut 123 threaded upon reduced portion 119 and engaging a flat stepped spring 124 under desired compression against washer 122. The nuts 123 are preferably provided with split portions 126 whereby a clamping bolt 127 passing therethrough may be employed to firmly lock the nut in adjusted position. It will thus be appreciated that nuts 123 on each end of the brake shoe beams and springs 124 will normally serve to prevent any lateral movement of the brake shoes as well as any rattle of the parts connected therewith. However, the springs 124, when properly adjusted, permit the brake shoes to evenly contact with the wheel treads.

Each of the brake shoe beams 110 and 111 is centrally actuated to cause the correspondingly numbered brake shoes to simultaneously engage the coaxially mounted wheels and provide a uniformly distributed braking pressure on each of said wheels. To accomplish this, I pivotally connect the equalizer arms 130 and 131 to the respective brake shoe beams 110 and 111 in such manner that a uniformly distributed braking action is simultaneously applied. In view of the fact that the equalizer arms 130 and 131 are each connected to their respective brake shoe beams in an identical manner, only one of them will be described in detail. As shown in Figs. 2 and 5, the central portion of beam 111 is provided with a reinforcing web having a substantially vertical hole 132 therethrough. A bolt 133 passing through hole 132 serves to rigidly secure a pair of brackets 134 to the central portion of beam 111. Each of these brackets is provided with an overlapping end 135 which fits over the edge of beam 111 and prevents the bracket from rotating about bolt 133 and also reinforces its clamped end. The brackets 134 are further provided with forwardly extending ends 137 which overhang the brake shoe beam and provide a yoke extending therefrom within which an equalizer arm may be pivotally supported at its central portion by a bolt 140 passing therethrough and through each of the members 137. The lower end of bolt 140 has a nut screwed thereon into light engagement with the lower bracket. This nut is preferably tightened just sufficiently to prevent any appreciable amount of side play between the opposed faces 142 and 143 of bosses 144 and 145 and the brackets 134, and yet permit a free pivotal movement of the equalizer arm upon bolt 140. The nut is further provided with a split portion having a clamping bolt 149 passing therethrough whereby the nut may be locked in adjusted position. The equalizer arms 130 and 131, which are the same construction, are wider at their central portions and taper towards their opposite ends to provide ample opportunity for sufficient pivotal movement about bolts 140 and equalize the braking pressures of each pair of interconnected braking shoes in the event that one of said shoes becomes worn more than another, or to compensate for a slight variation in the size of coaxially mounted car wheels and finally to provide sufficient brake shoe movement when all the shoes become greatly worn and the wheels become reduced in diameter.

To cause the brake shoe beams 110 and 111 to move towards the wheel axis and bring each pair of braking shoes into simultaneous and uniform braking engagement with the wheels, the respective ends 150 and 151 of arms 130 and 131 are pivotally interconnected by a rigid link 156, and the opposite end 152 of arm 130 is pivotally fastened to the end of a rigid anchor beam 158 adjustably secured at its other end to the truck frame, and linkage connected between the pneumatically operated motor 60 and the end 153 of arm 131 serves to transmit the movement of piston 65 to the brake shoes. It will thus be appreciated that the piston 65 acts through interconnected linkage to exert a pull upon arm 131 causing it to rotate clockwise about its pivot bolt 140 and through link 156 tending to exert a similar clockwise rotation of arm 130 about its respective pivot bolt 140. However, the end 152 of arm 130 is pivotally secured to the rigid anchor beam 158. Hence, any force tending to move arm 131 about pivot 140 and to also move arm 130 about its pivot 140 tends to draw the brake beams 110 and 111 towards each other and causes each pair of shoes 75 and 76 to simultaneously exert a braking force upon the wheels. It will also be appreciated, in view of the fact that each of the arms 130 and 131 are pivotally and centrally connected to the mid points of beams 110 and 111, that the correspondingly numbered brake shoes will present a uniformly distributed and completely equalized braking action upon each of the wheels at the same time. The link 156 which is preferably shaped as an I-beam to increase its rigidity and lessen its weight, is provided at each end with a head 160 having a hole therethrough adapted to receive a pivot bolt 161 which rotatably supports the end of the link and is mounted within a bracket 162 having a bifurcated portion 163 rigidly clamped to the respective ends of arms 130 and 131 by a bolt 164. Bolt 161 is adjustably secured in position by means of a nut 165 which preferably is provided with a split end having a locking bolt 166 therethrough to prevent its loosening from position. As illustrated in Fig. 1, each of the pivot bolts 161 has a relatively long vertical bearing within the head 160 and the bracket 162 to prevent the brake shoe beams from rocking out of harmony with each other, since the combined weight of the brake shoes and equalizer arms tends to twist the brake beams downward on their respective sides toward the wheel axles.

The end 152 of equalizer arm 130 is pivotally and adjustably located in one of several predetermined positions relative to the truck frame through the endwise adjustment of the anchor bar 158 which may be progressively advanced as the shoes wear to balance the lever system. Hence, any movement imparted to said arm by link 156 will result in a pivotal movement of the arm about its end 152 and cause a simultaneous movement of the brake shoe beams 110 and 111 to either engage or disengage all of the brake shoes 75 and 76 with the wheels 26. To accomplish this, a barrel bodied link 170 is provided with laterally projecting extensions 171 embracing the end 152 of arm 130 and rigidly secured thereto by a bolt 174 as shown in Figs. 1 and 3. The link is further provided with a body 175 having a vertical hole 176 extending therethrough and arranged to rotatably and slidably receive a depending stud 177 terminating in a tapered portion 180 at its upper end which is rigidly secured within a tapered hole in the end of anchor beam 158 by means of a nut 182 threaded on a reduced portion 183. The link 170 is arranged to slide as well as rotate upon stud 177 in view of the fact that it will assume a higher position on said stud as the brake shoes become worn. Furthermore, the movement of the brake shoes into and out of operative engagement will result in a slight up and down movement of brake shoe beam 110 which must be compensated for in a vertical sliding movement of link 170 upon stud 177 since the stud is fixed relative to the truck frame 10.

Each anchor beam 158 is adjustably secured to one of the intermediate cross frame members so that the stud 177 which serves to pivotally locate the end 152 of arm 130 may be adjustably located so that arm 130 will normally lie substantially parallel to the brake shoe beam 110 when the brake shoes 75 are in operative engagement. Anchor beam 158 is preferably shaped as an I-beam to provide sufficient rigidity and yet maintain it light in weight. The inner end of each anchor beam is supported upon an upwardly projecting pad 184 cast integral with an intermediate cross frame member and rigidly secured thereto by a plurality of clamping bolts 185 having washers 186 thereon which overlie the bottom flange of the I-beam and are frictionally clamped thereagainst. As shown in Fig. 3, each anchor beam is provided with a plurality of spaced semicircular cuts 188 within the edge of the lower flange of its I-beam section and arranged to be selectively engaged by the body of a locating cap screw 190 threaded within the pad 185. It will thus be appreciated that the position of pivot stud 177 may be selectively located by removing cap screw 190 and loosening bolts 185, whereupon the anchor beam 158 may be longitudinally positioned so that cap screw 190 may engage any one of the spaced semi-circular cuts 188 as desired. Hence, as the brake shoes become worn, the anchor beam may be selectively located to compensate for said wear until the shoes are completely worn out.

If it is desired to use the maximum extent of anchor beam adjustment, I preferably provide one more replacement link 156 of different length to compensate therefor so that the respective equalizer arms 130 and 131 may be maintained substantially parallel to their respective brake shoe beams 110 and 111, thereby permitting each equalizer arm a maximum pivotal movement to compensate for uneven brake shoe wear. The links 156 may be quickly and easily interchanged by removal from and replacement at the pivot bolts 160 at each end thereof. It will be understood, of course, that this replacement will not often be necessary since the brake shoes wear slowly.

A link 192 is provided with a horizontally extending slot 193 which receives the end 153 of equalizer arm 131 and is pivotally secured thereto about a vertical axis by a bolt 194. Link 192 is further provided with a projecting portion 195 having a substantially vertical slot within which a clevis 196 is pivotally secured about a horizontal axis by a bolt 197. The clevis 196 is threaded on one end of a tension rod 200 which is slidably received at its other end within a hole 205 through a trunnion member 207 having an enlarged central portion 208 and reduced laterally protruding portions 210 and 211 journalled within the respective cup members 212 and 213 which are closed at their outer ends and abut the enlarged central portion 208 to keep the bearings free from dirt and grit. Grease or other suitable lubricant may be applied within the cup members in any suitable manner to lubricate the shaft portions 210 and 211 therein. In my preferred construction as illustrated, the ends of shafts 210 and 211 are spaced from the bottoms of the respective cups 212 and 213 leaving pockets therebetween which may be filled with a suitable lubricant such as grease by means of fittings 214 secured within holes passing through the respective ends of said cups. The lubricant will further serve to seal the bearing against the entrance of dirt and grit. The cup members 212 and 213 are respectively clamped in the opposed arms 215 and 216 of a bifurcated head 218 at the lower end of a lever 220. The lower ends of the arms 215 and 216 are preferably split and having clamping bolts 222 passing therethrough which serve to rigidly clamp the bearing cups 212 and 213 in their respective desired position. The end of tension rod 200 adjacent to lever 220 has a sleeve 224 slidably mounted thereon, and a nut 225 adjustably located on the threaded end 226 of rod 200 engages sleeve 224 and serves to regulate the relative positions of the brake shoes to lever 220 as the shoes become worn.

Lever 220 is pivotally supported intermediate of its ends upon a pin 230 journalled therein and passing through the laterally spaced arms 231 and 232 of a bracket 233 suitably and rigidly secured to the pad 184 as by cap screws 235. A stud 236 is adjustably threaded within the lower end of lever 220 intermediate of the central pivot pin 230 and the rod 200 to engage the side of an intermediate cross frame member and limit the forward movement of the lower portion of lever 220, thereby adjustably limiting the extent to which the brake shoes may be withdrawn from the wheels 26. The upper end of lever 220 is further provided with a pair of spaced laterally extending ears 237 and 238 having a pin 240 journalled therein and within the end of a link 242 which is pivotally connected by a pin 244 at its other end to the slotted portion 69 on the end of piston rod 66.

It will thus be appreciated that air pressure entering chamber 73 of cylinder 61 from any suitable source will serve to engage piston 65 and start the piston rod 66 moving out of the cylinder. This movement of piston rod 66 is transmitted through link 242 and lever 220 to exert a pull upon rod 200 which pivotally actuates equalizer arms 131 and 130 and causes the brake shoe beams 111 and 110 to simultaneously and uniformly present all four of the brake shoes 75 and 76 into braking engagement with the wheel treads to evenly and smoothly retard and stop the wheel rotation. Due to the double pivotal connection of the link 192 with clevis 196 and arm 131 by means of the pivot bolts 197 and 194, the change of angular movement between rod 200 and arm 131 will be compensated for, and there will be no tendency for various parts of the linkage to bind. I preferably provide several interchangeable levers 220 having different distances between their various pivot points, and I also provide correspondingly different brackets 233 therefor so that various different braking leverages may be obtained dependent on the extent of braking action required. To facilitate changing these various parts, the pins 230 and 240 may be suitably secured in position in such manner as to be easily removed and replaced.

It will thus be appreciated that by employing various interchangeable levers 220 with different ratios of leverage, the desired braking pressure may be applied simultaneously to each pair of car wheels irrespective of the braking pressures applied to other car wheels. Hence, the braking pressure may be regulated to be in direct proportion to the weight carried by each pair of car wheels thereby providing an equalized braking pressure per unit weight throughout an entire train. By interchanging levers 220 and their respective brackets 233 in this manner, the brake shoe and wheel tread wear will be minimized, and the wear of all brake shoes and all wheels throughout a train will be substantially uniform thereby necessitating less frequent adjustments of the braking mechanism.

Although the action of gravity normally serves to release the brakes from wheel engagement when air pressure is released from chamber 73, I also provide a mechanical means whereby the brakes will be aided in their disengagement from the wheels and piston 65 will be returned to an initial position in the back of cylinder 61. To accomplish this, the lower flanges of I-beams 21 and 22 are each provided with a clip 246 adjustably secured thereto by a clamping bolt 248 and having a depending ear 250. Each clip is adjustably clamped to the lower flange of its respective I-beam in a position substantially in alignment with the end of rod 200 received within clevis 196. The depending portion 250 has a hole therethrough which slidably receives an eye bolt 251 having nuts 253 threaded upon its end in engagement with member 250. The eye of bolt 251 has one end of a coiled spring 256 pivotally secured therein, and the other end of said spring is hooked about a stud 257 rigidly secured to and projecting from a clip 260 adjustably clamped upon rod 200 by means of a pair of clamping bolts 261. The clip 260 is adjustably secured on rod 200, and nuts 253 are adjustably secured on the end of eye bolt 251 so that spring 256 is normally under sufficient tension to cause the piston 65 to move to an initial rearward position preparatory for its next forward operative stroke to again apply the brakes. The tension of spring 256 also aids the action of gravity in maintaining all four of the brake shoes completely withdrawn from operative position and stud 236 engaged against an intermediate cross frame member. I preferably provide two nuts 253 on the end of eye bolt 251 so that they may be locked against each other, and the vibrations of traffic will not tend to loosen them from adjusted position.

As illustrated, I preferably provide a separate brake mechanism for each pair of coaxially mounted wheels, but it will be appreciated that each of these mechanisms are duplicate in construction and are interconnected by the same air pressure system. Hence, all four wheels of a car truck will be simultaneously engaged by their respective braking mechanisms, and each pair of wheels having a preadjusted pressure at its brake shoes will be retarded at the same rate so that the car supported thereabove will normally be brought to an even, jerkless stop.

I have found that there are occasions when it is desirable to apply braking pressure to the wheels without the use of my air pressure motors 60. To accomplish this, I have provided an upwardly extending portion upon the end of each lever 220 having a semispherical seat terminating in a flared hole 272. The spherical seat is adapted to receive a ball 273 universally seated therein and having a hole therethrough within which a tension rod 276 is slidably engaged. The end of the tension rod is provided with a threaded portion 277 having a sleeve 279 slidably mounted thereon and engaging ball 273 at one end and an adjustable nut 281 at the other end threaded upon end 277 and locked in position by a bolt 283. The other end of rod 276 may be suitably connected to a lever conveniently located within the car supported above truck frame 10. The universal connection of ball 273 within seat 270 serves to compensate for any relative movement between the car body and the truck frame 10. It will thus be appreciated that any tensioned axial movement of rod 276 will serve to pivotally move lever 220 and engage or disengage the brake mechanism as desired.

In view of the fact that many changes could be made in the above construction and various different embodiments of this invention could be devised without departing from the scope thereof, it is intended that all subject matter disclosed in the above description of my invention or shown in the accompanying drawings, shall be only interpreted as illustrative and not as of a limiting nature.

It is to be further understood that the language employed within the accompanying claims is intended to cover all of the generic and specific features of my invention as herein described and all statements of the scope of this invention which, as a matter of language, might be considered to fall therebetween.

I claim as my invention:

1. A railway car braking mechanism comprising a car truck frame supported by a plurality of rotatably mounted car wheels, a brake shoe engageable with the tread of each car wheel, means connected to the frame including a device which pivotally supports each brake shoe for a swinging movement into and out of wheel engagement, a brake shoe beam interconnecting and rotatably journalled within a pair of brake shoes, an equalizer arm, a bracket pivotally connecting the mid portion of the equalizer arm to the mid portion of the brake shoe beam, an anchor beam adjustably and rigidly secured at one end to the truck frame, means pivotally and slidably connecting the other end of the anchor beam to one end of the centrally pivoted equalizer arm, power actuated mechanism pivotally secured to the other end of the equalizer arm and arranged to move the brake shoe beam and simultaneously cause a uniformly distributed braking pressure of two brake shoes against a pair of wheels, and means to adjust the position of the anchor beam on the frame to compensate for brake shoe wear.

2. A railway car braking mechanism comprising a car truck supported by a plurality of coaxially mounted car wheels, a pair of opposed brake shoes frictionally engageable with the tread of each car wheel, means connected to the truck frame which individually supports each brake shoe for movement into and out of engagement with a car wheel, separate brake shoe beams pivotally interconnecting each pair of brake shoes on the same side of two coaxially mounted car wheels, an equalizer arm disposed in the same general plane as each beam, means pivotally connecting each brake shoe beam and arm centrally of their ends, means pivotally anchoring one end of an equalizer arm, means pivotally connecting the opposed end of said arm with the corresponding end of the other equalizer arm and power actuated means pivotally engaging the other end of said second arm whereby all four brake shoes may be simultaneously brought into uniformly distributed braking engagement with the coaxially mounted car wheels to evenly retard their motion and bring a car to a smooth, shockless stop.

3. A railway car braking mechanism comprising a car truck frame supported by a plurality of coaxially mounted car wheels, a pair of opposed brake shoes for each wheel moveable towards and from the opposite sides of the wheel axis to frictionally engage the tread of each car wheel, means connected to the car frame arranged to individually and pivotally support each brake shoe for swinging movement into and out of braking engagement, a separate horizontally disposed brake shoe beam rotatably supporting and interconnecting each pair of brake shoes on the same side of two coaxially mounted car wheels, a horizontally disposed equalizer arm pivotally and centrally secured to the mid point of each brake shoe beam, means including a pin which pivotally anchors one end of an equalizer arm relative to the truck frame, means to selectively position said pin relative to the frame to compensate for brake wear, a link pivotally interconnecting the opposite end of said equalizer arm with the corresponding end of the other equalizer arm, mechanism connected to the other end of said last mentioned arm arranged to move it and thereby simultaneously engage all four brake shoes with a uniformly distributed pressure against the two coaxially mounted car wheels and resilient means tending to normally withhold the brake shoes from wheel engagement.

4. A brake mechanism for railway cars comprising a truck frame supported by a plurality of coaxial car wheels, a pair of brake shoes for each wheel moveable into braking engagement with the opposite sides of the wheel tread, means including members pivotally connected to supports on the frame and arranged to provide a swinging movement for each brake shoe whereby it may move into and out of braking contact with the wheel tread, a separate horizontally disposed brake shoe beam rotatably supporting and interconnecting each pair of brake shoes on the same side of and engageable with two coaxially mounted car wheels, means yieldably securing the brake shoes to the beam, a horizontally disposed equalizer arm pivotally and centrally fastened to a point central of the ends of each brake shoe beam, an anchor beam rigidly but adjustably secured at one end to the frame, a pivotal connection securing one end of an equalizer arm to the other end of the anchor beam, means to selectively locate the anchor beam on the frame to compensate for brake wear, a link pivotally interconnecting the opposite end of said equalizer arm with the corresponding end of the other equalizer arm, an air pressure actuated mechanism including a piston and cylinder device connected through associated linkage to the other end of said last mentioned arm to move it and simultaneously apply a pair of brakes to each of two coaxially mounted wheels under an evenly distributed pressure, means to adjust said linkage and compensate for brake wear, resilient means to normally withdraw the brake shoes from operative positions and return the piston to an initial position, and manually operated means to apply the brakes when the air pressure is disconnected from the piston and cylinder.

5. In a railway car brake mechanism, a car truck frame supported by a plurality of pairs of coaxial wheels, a brake shoe for each wheel, a brake shoe beam pivotally interconnecting the shoes on a pair of said wheels, means on the frame individually supporting each shoe for free swinging pivotal movement into and out of wheel engagement, an equalizer arm, means pivotally connecting said beam and arm between their ends for relative rocking movements, an anchor member adjustably secured at one end to the frame, means to adjust said anchor member, a fixed pivot depending from the other end of said member, means slidably and pivotally connecting an end of the equalizer arm to said pivot, and operating means connected to the other end of the equalizer arm to swing said arm on the pivot and causing a uniformly distributed braking action.

CHARLES DE LOS RICE.